(12) United States Patent
Krishnan et al.

(10) Patent No.: US 10,794,735 B2
(45) Date of Patent: Oct. 6, 2020

(54) PRESSURIZED SENSOR SEAL

(71) Applicant: Ford Global Technologies, LLC, Dearborn, MI (US)

(72) Inventors: Venkatesh Krishnan, Canton, MI (US); Rashaun Phinisee, Ypsilanti, MI (US); James Pizzimenti, Carleton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/059,957

(22) Filed: Aug. 9, 2018

(65) Prior Publication Data
US 2020/0049535 A1    Feb. 13, 2020

(51) Int. Cl.
| *G01D 11/24* | (2006.01) |
| *G01C 21/26* | (2006.01) |
| *B60R 11/04* | (2006.01) |
| *B60R 11/02* | (2006.01) |
| *B60R 11/00* | (2006.01) |

(52) U.S. Cl.
CPC ......... *G01D 11/245* (2013.01); *G01C 21/265* (2013.01); *B60R 11/0258* (2013.01); *B60R 11/04* (2013.01); *B60R 2011/004* (2013.01)

(58) Field of Classification Search
CPC ..... G01D 11/245; G01D 11/24; G01C 21/265
See application file for complete search history.

(56) References Cited

U.S. PATENT DOCUMENTS

| 9,304,386 B1* | 4/2016 | Clement ................ G03B 17/08 |
| 2009/0201137 A1* | 8/2009 | Weller ...................... B60R 1/12 |
| | | 340/425.5 |
| 2015/0274091 A1* | 10/2015 | Lang ....................... B60R 11/04 |
| | | 348/148 |
| 2015/0380781 A1* | 12/2015 | Steinmeyer ......... H01M 10/625 |
| | | 429/50 |

FOREIGN PATENT DOCUMENTS

| DE | 102015115013 A1 | 3/2017 |
| KR | 2020110009648 U | 10/2011 |

* cited by examiner

*Primary Examiner* — Jamel E Williams
(74) *Attorney, Agent, or Firm* — Frank A. MacKenzie; Bejin Bieneman PLC

(57) ABSTRACT

An apparatus includes a housing including an aperture, a sensor in the housing and having a field of view received through the aperture, a seal sealing a gap between the sensor and the aperture, and a blower positioned to blow into the housing. The seal may be attached to the housing concentrically around the aperture.

20 Claims, 6 Drawing Sheets

PRESSURIZED SENSOR SEAL

BACKGROUND

Vehicles typically include sensors. The sensors can provide data about operation of the vehicle, for example, wheel speed, wheel orientation, and engine and transmission data (e.g., temperature, fuel consumption, etc.). The sensors can detect the location and/or orientation of the vehicle. The sensors can be global positioning system (GPS) sensors; accelerometers such as piezo-electric or microelectromechanical systems (MEMS); gyroscopes such as rate, ring laser, or fiber-optic gyroscopes; inertial measurements units (IMU); and/or magnetometers. The sensors can detect the external world, e.g., objects and/or characteristics of surroundings of the vehicle, such as other vehicles, road lane markings, traffic lights and/or signs, pedestrians, etc. For example, the sensors can be radar sensors, scanning laser range finders, light detection and ranging (LIDAR) devices, and/or image processing sensors such as cameras. The sensors can be communications devices such as vehicle-to-infrastructure (V2I) or vehicle-to-vehicle (V2V) devices.

DETAILED DESCRIPTION

Figure 1:
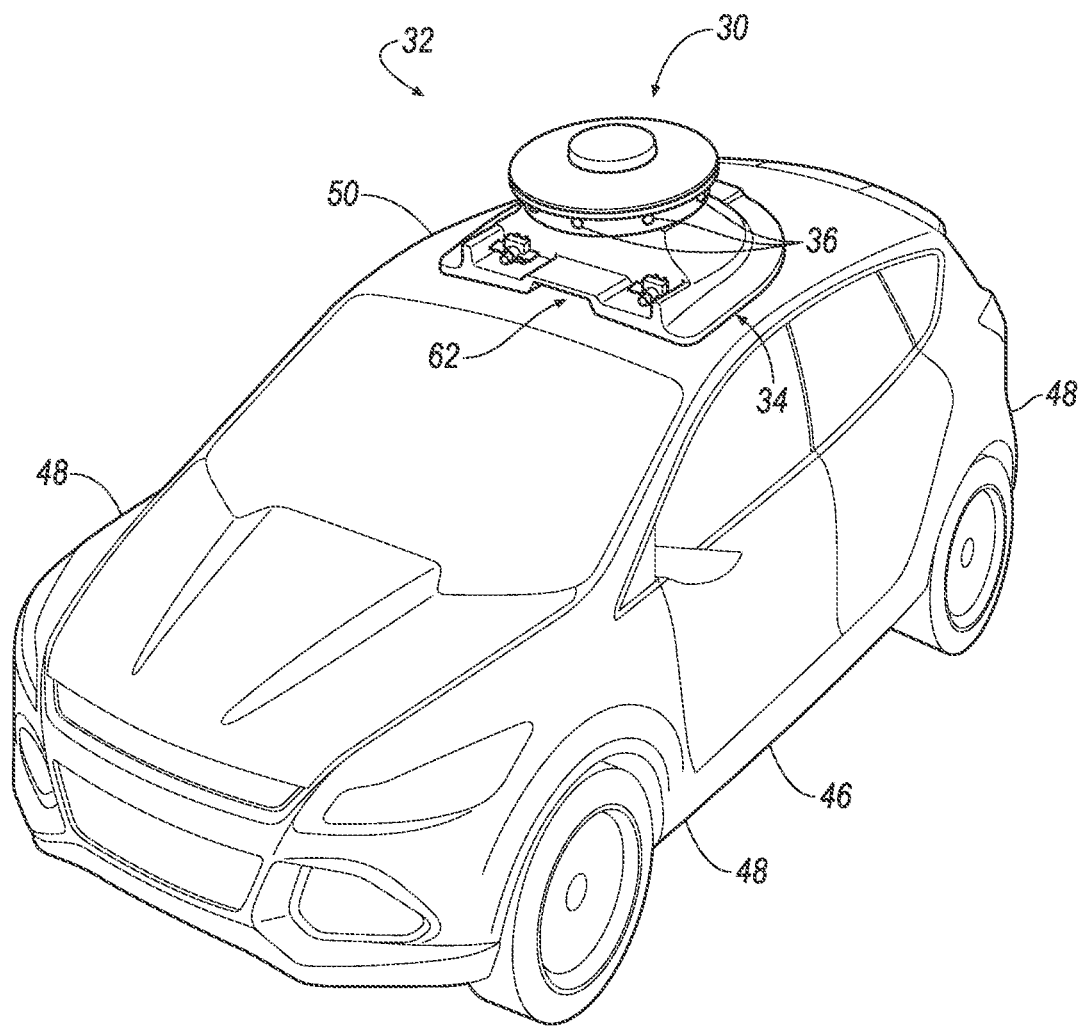
FIG. 1 is a perspective view of an example vehicle.

An exemplary apparatus comprises a housing including an aperture; a sensor in the housing and having a field of view received through the aperture; a seal sealing a gap between the sensor and the aperture; and a blower positioned to blow into the housing.

The seal can be attached to the housing concentrically around the aperture.

The seal can be adhered to the housing.

The sensor can include a groove, and the seal can be engaged with the groove.

The seal can have an interference fit with the sensor.

The housing can include a rib extending along an edge of the aperture, and the seal is engaged with the rib.

The seal can include a contact surface abutting the housing and a bore aligned with the aperture. The bore can include a first section spaced from the sensor and a second section concentrically contacting the sensor, and the second section can be between the first section and the aperture. The sensor can extend through the second section.

The sensor can extend into the aperture.

The seal can be radially symmetric.

The housing can include a chamber in which the sensor is disposed, and the blower can be disposed outside the chamber and positioned to blow into the chamber.

The housing can include a second chamber in which the blower is disposed, and the blower can be positioned to draw air from an ambient environment outside the housing.

The sensor can include a plurality of thermally conductive fins.

The aperture can be a first aperture, the sensor a first sensor, the seal a first seal, and the housing can include a second aperture; the apparatus further comprising a second sensor having a field of view received through the second aperture, and a second seal sealing a gap between the second sensor and the second aperture. The housing can include a chamber, the first and second sensors can be disposed in the chamber, and the blower can be positioned to blow into the chamber.

A further exemplary apparatus comprises a housing including an aperture; a sensor in the housing and having a field of view received through the aperture; a seal sealing a gap between the sensor and the aperture; and means for pressurizing the housing.

The seal can be attached to the housing concentrically around the aperture.

The sensor can include a plurality of thermally conductive fins.

The seal can have an interference fit with the sensor.

With reference to the Figures, an apparatus 30 for a vehicle 32 includes a housing 34 including at least one aperture 36, at least one sensor 38 in the housing 34 and having a field of view received through a respective one of the apertures 36, at least one seal 40 sealing a gap 42 between the respective sensor 38 and the respective aperture 36, and a blower 44 positioned to blow into the housing 34.

The apparatus 30 can provide a pressure-fit sealing of the housing 34 where the sensor 38 is located. The apparatus 30 can hold the sensor 38 sufficiently still, which can permit the sensor 38 to detect the environment with a high degree of accuracy. The apparatus 30 can prevent the seal 40 from separating even when the sensor 38 is facing a headwind, i.e., is facing forward while the vehicle 32 travels at high speed. The apparatus 30 can have a low dimensional stack-up, i.e., can occupy a low volume of space, because of a small number of components sealing the sensor 38 to the housing 34.

With reference to FIG. 1, the vehicle 32 may be any passenger or commercial automobile such as a car, a truck, a sport utility vehicle, a crossover vehicle, a van, a minivan, a taxi, a bus, etc.

The vehicle 32 may be an autonomous vehicle. A computer can be programmed to operate the vehicle 32 independently of the intervention of a human driver, completely or to a lesser degree. The computer may be programmed to operate the propulsion, brake system, steering, and/or other vehicle systems. For the purposes of this disclosure, autonomous operation means the computer controls the propulsion, brake system, and steering without input from a human driver; semi-autonomous operation means the computer controls one or two of the propulsion, brake system, and steering and a human driver controls the remainder; and nonautonomous operation means a human driver controls the propulsion, brake system, and steering. The computer may rely on data from the sensors 38 to autonomously or semi-autonomously operate the vehicle 32.

The vehicle 32 includes a body 46. The vehicle 32 may be of a unibody construction, in which a frame and the body 46 of the vehicle 32 are a single component. The vehicle 32 may, alternatively, be of a body-on-frame construction, in which the frame supports the body 46 that is a separate component from the frame. The frame and body 46 may be formed of any suitable material, for example, steel, aluminum, etc. The body 46 includes body panels 48, 50 partially defining an exterior of the vehicle 32. The body panels 48, 50 may present a class-A surface, e.g., a finished surface exposed to view by a customer and free of unaesthetic blemishes and defects. The body panels 48, 50 include, e.g., a roof 50, etc.

Figure 2:
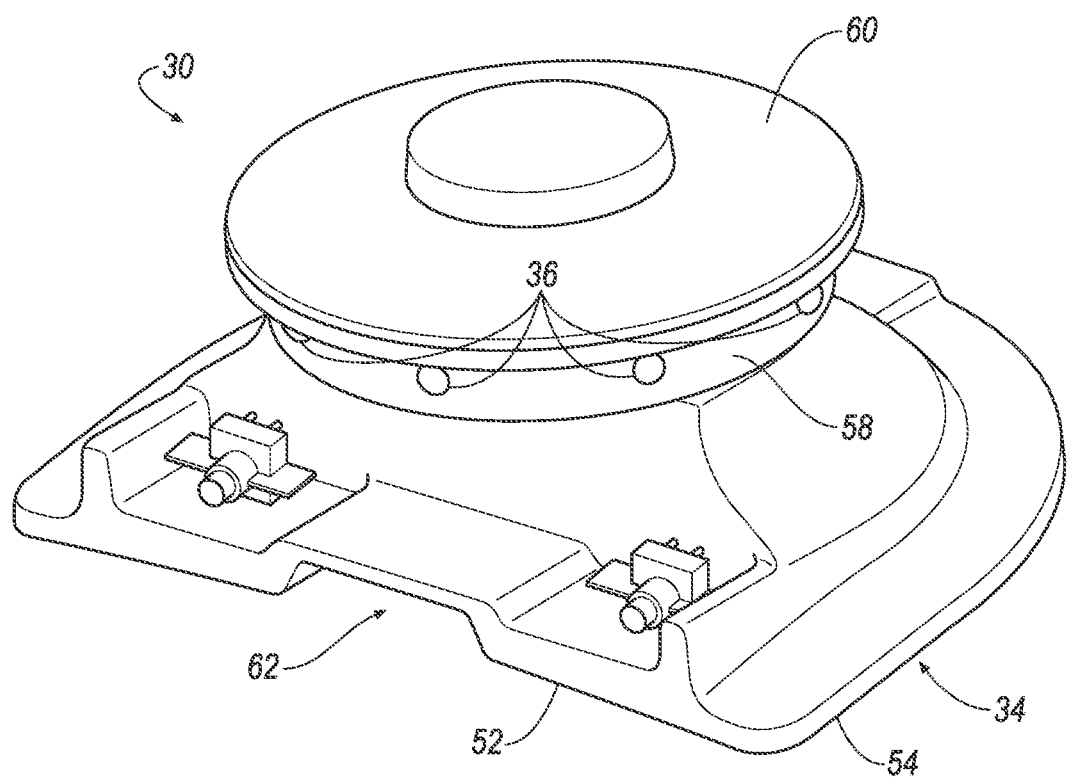
FIG. 2 is a perspective view of an example housing on the vehicle of FIG. 1.

With reference to FIG. 2, the housing 34 for the sensors 38 is attachable to the vehicle 32, e.g., to one of the body panels 48, 50 of the vehicle 32, e.g., the roof 50. For example, the housing 34 may be shaped to be attachable to the roof 50, e.g., may have a shape matching or following a contour of the roof 50. The housing 34 may be attached to the roof 50, which can provide the sensors 38 with an unobstructed field of view of an area around the vehicle 32. The housing 34 may include a forward-facing panel 52, i.e., a panel facing forward relative to the vehicle 32 when the housing 34 is attached to, e.g., the roof 50. The housing 34 may be formed of, e.g., plastic or metal.

Figure 3:
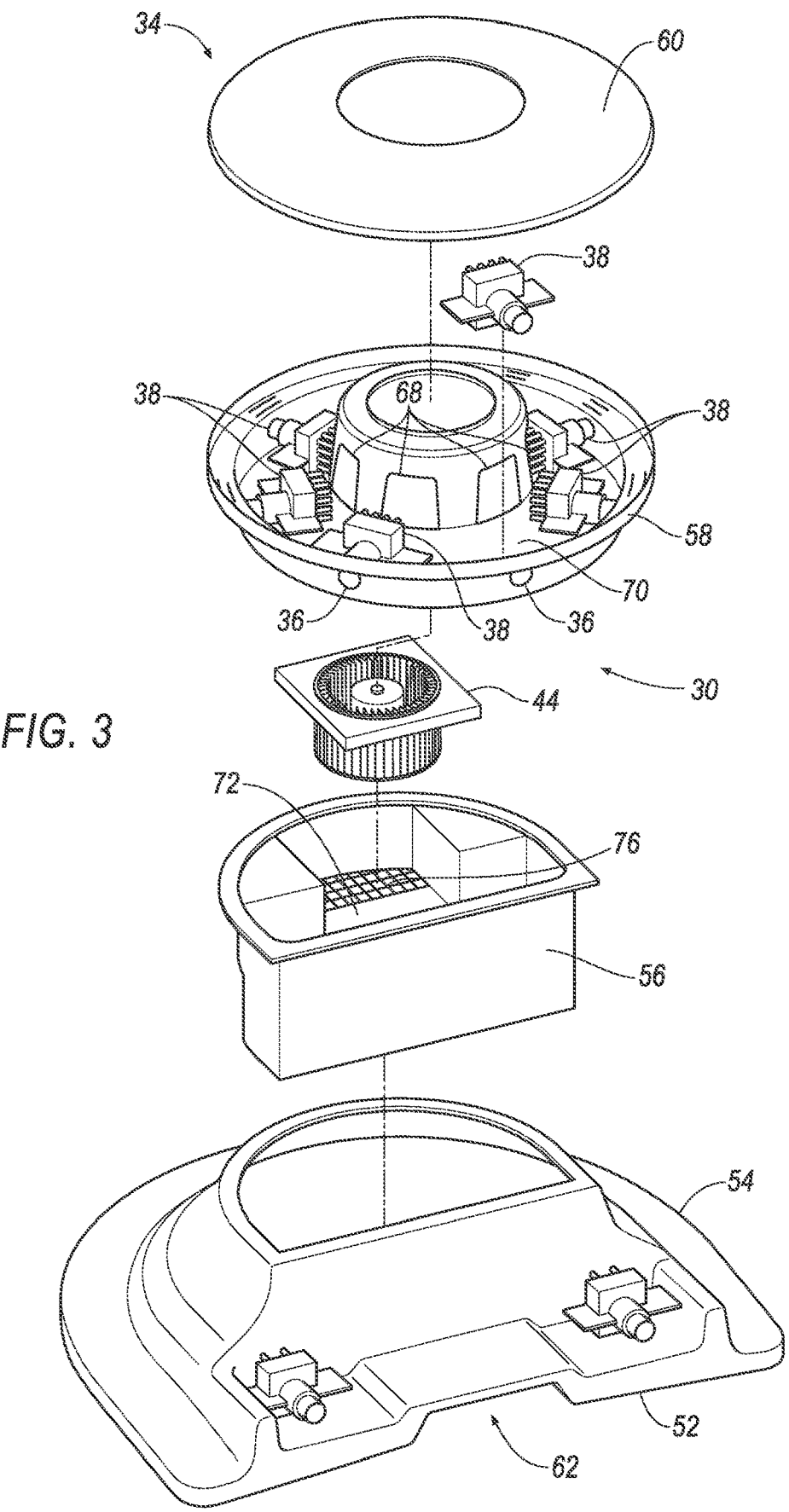
FIG. 3 is an exploded view the housing of FIG. 2.

With reference to FIG. 3, the housing 34 may include a base 54, a bucket 56, a tray 58, and a top cover 60. The base 54 may be attached to the roof 50 and may include the forward-facing panel 52. The forward-facing panel 52 of the base 54 may define an intake opening 62. The bucket 56 may sit in the base 54. The bucket 56 may be a container with an open top. The tray 58 may sit on top of the base 54 and the bucket 56. The sensors 38 may be disposed in the tray 58. The tray 58 may include a circumferential outer wall 64 and a circumferential inner wall 66. The apertures 36 may be in the outer wall 64. The inner wall 66 may include tray openings 68 positioned radially inward from respective sensors 38 relative to the tray 58. The top cover 60 may be attached to the tray 58 and may enclose the tray 58 from the inner wall 66 to the outer wall 64. The tray 58 and the top cover 60 may together form a toroidal shape.

Figure 4:
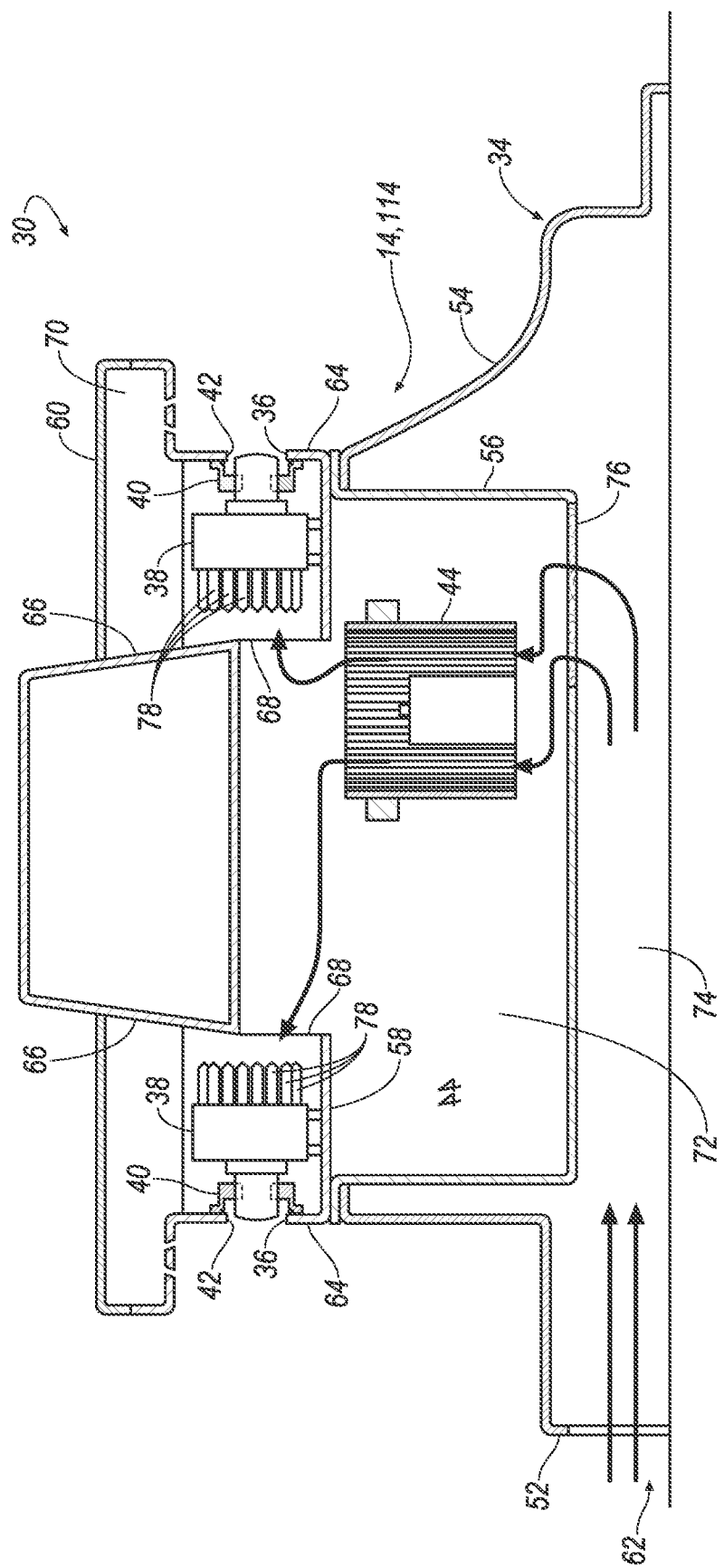
FIG. 4 is a side cross-sectional view of the housing of FIG. 2.

With reference to FIG. 4, the housing 34 includes a first chamber 70 in which the sensors 38 are disposed, and the housing 34 includes a second chamber 72 in which the blower 44 is disposed. The first chamber 70 may be disposed above the second chamber 72. For example, the tray 58 and the top cover 60 may enclose and constitute the first chamber 70. For example, the base 54 and the bucket 56 may enclose and constitute the second chamber 72, as shown in FIG. 4. Alternatively, one or more of the body panels 48, 50, e.g., the roof 50, may partially constitute the second chamber 72.

The blower 44 increases the pressure of a gas by reducing a volume of the gas or by forcing additional gas into a constant volume. The blower 44 may be any suitable type of blower, e.g., a positive-displacement compressor such as a reciprocating, ionic liquid piston, rotary screw, rotary vane, rolling piston, scroll, or diaphragm compressor; a dynamic compressor such as an air bubble, centrifugal, diagonal, mixed-flow, or axial-flow compressor; a fan; or any other suitable type.

The blower 44 is positioned to draw air from an ambient environment outside the housing 34 and to blow the air into the first chamber 70. The blower 44 is disposed in the second chamber 72 outside the first chamber 70, e.g., attached to the bucket 56 inside the bucket 56. For example, air may enter through the intake opening 62, travel through a passageway 74 below the second chamber 72, travel to a filter 76 leading through a bottom of the bucket 56, and then travel to the blower 44. The filter 76 removes solid particulates such as dust, pollen, mold, dust, and bacteria from air flowing through the filter 76. The filter 76 may be any suitable type of filter, e.g., paper, foam, cotton, stainless steel, oil bath, etc. The blower 44 may blow the air into the second chamber 72, and the air may travel through the tray openings 68 into the first chamber 70.

Alternatively to the blower 44, the apparatus 30 may pressurize the first chamber 70 of the housing 34 in other ways. For example, forward motion of the vehicle 32 may force air through passageways leading to the first chamber 70. For another example, the first chamber 70 may be pre-pressurized to a pressure above atmospheric pressure and then sealed in an airtight manner.

Figure 5:
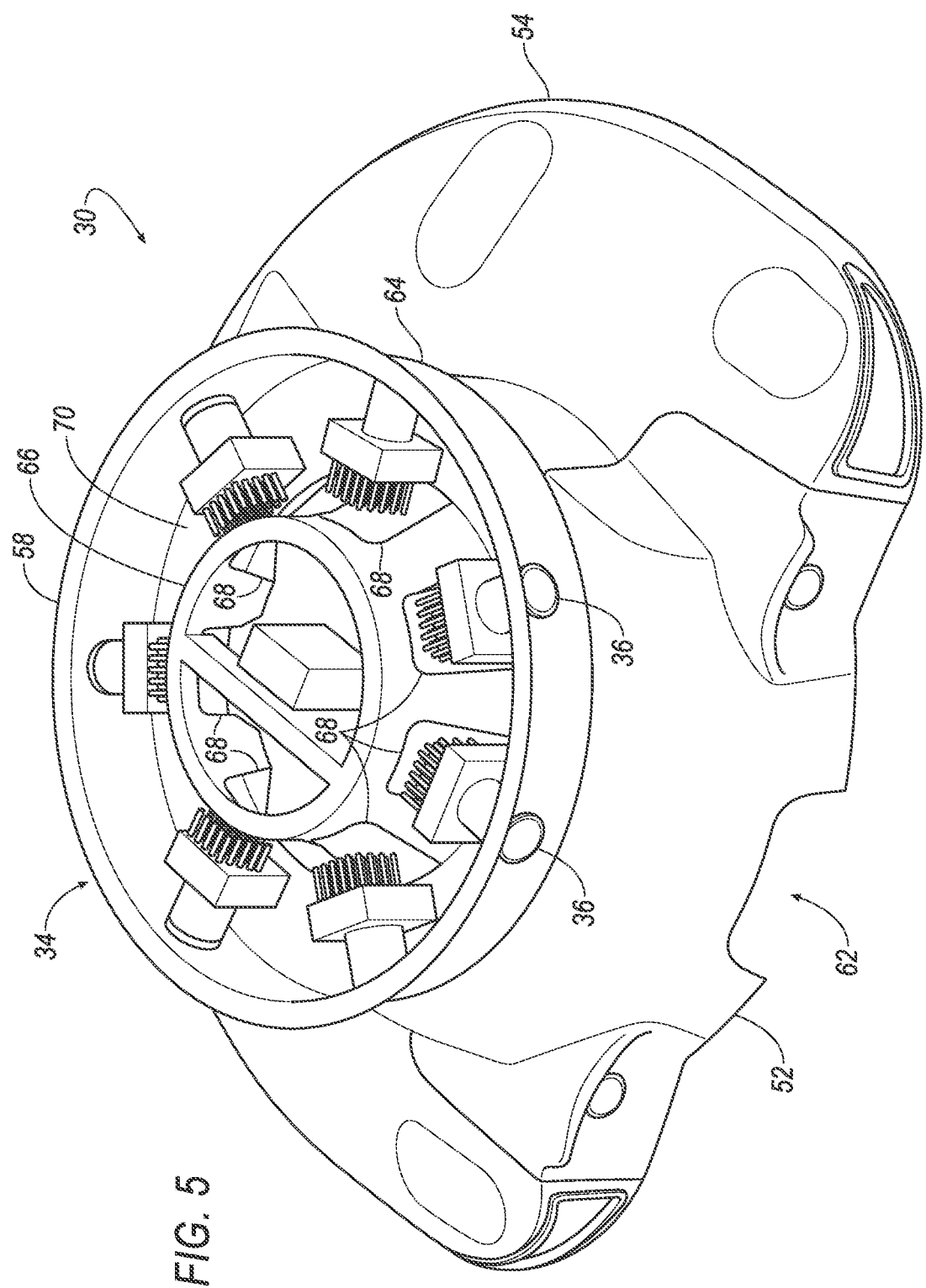
FIG. 5 is a perspective view of the housing of FIG. 2 with a chamber exposed for illustration.

With reference to FIG. 5, the sensors 38 may detect the location and/or orientation of the vehicle 32. For example, the sensors 38 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 38 may detect the external world, e.g., objects and/or characteristics of surroundings of the vehicle 32, such as other vehicles, road lane markings, traffic lights and/or signs, pedestrians, etc. For example, the sensors 38 may include radar sensors, scanning laser range finders, light detection and ranging (LIDAR) devices, and image processing sensors such as cameras. The sensors 38 may include communications devices, for example, vehicle-to-infrastructure (V2I) or vehicle-to-vehicle (V2V) devices.

In particular, the sensors 38 disposed in the housing 34 may be cameras arranged to collectively cover a 360° horizontal field of view. Each sensor 38 has a field of view, and the field of view of one of the sensors 38 may overlap the fields of view of the sensors 38 that are circumferentially adjacent to one another, i.e., that are immediately next to each other.

Figure 6:
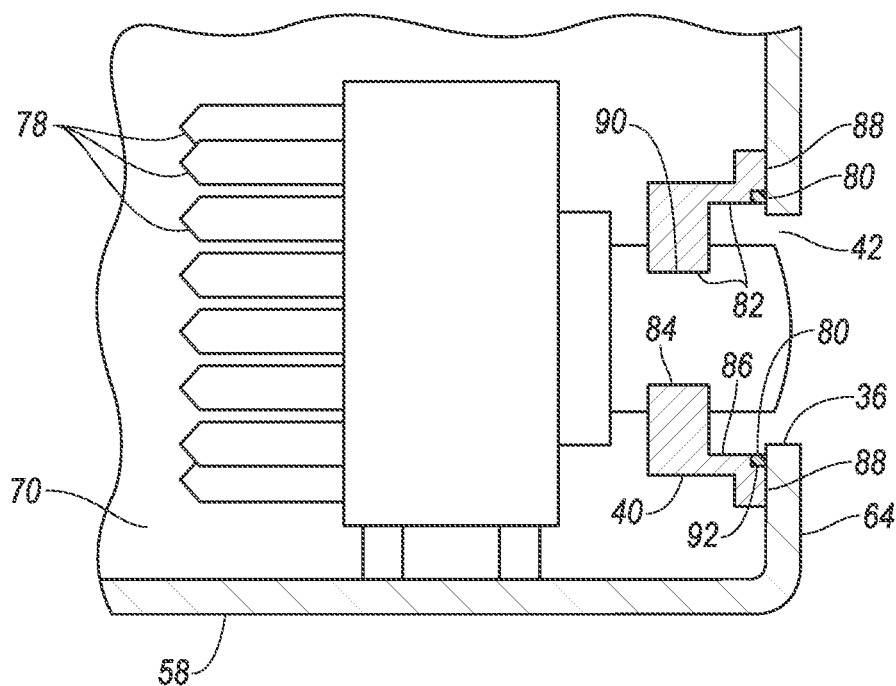
FIG. 6 is a side cross-sectional view of a sensor in the housing of FIG. 2.

With reference to FIG. 6, each sensor 38 includes a plurality of fins 78. The fins 78 are thermally conductive, i.e., have a high thermal conductivity, e.g., a thermal conductivity equal to at least 15 watts per meter-Kelvin (W/(m K)), e.g., greater than 100 W/(m K), at 25° C. For example, the fins 78 may be aluminum. The fins 78 may be shaped to have a high ratio of surface area to volume, e.g., long, thin poles or plates.

The housing 34 includes the apertures 36. The apertures 36 are holes in the housing 34 leading from the first chamber 70 to the ambient environment. The apertures 36 may be through the outer wall 64 of the tray 58. The apertures 36 may be circular in shape. The housing 34 includes one aperture 36 for each of the sensors 38. Each sensor 38 has a field of view received through the respective aperture 36. The sensors 38 may extend into the respective apertures 36. For example, the aperture 36 may be concentric about a portion of the sensor 38.

Figure 7:
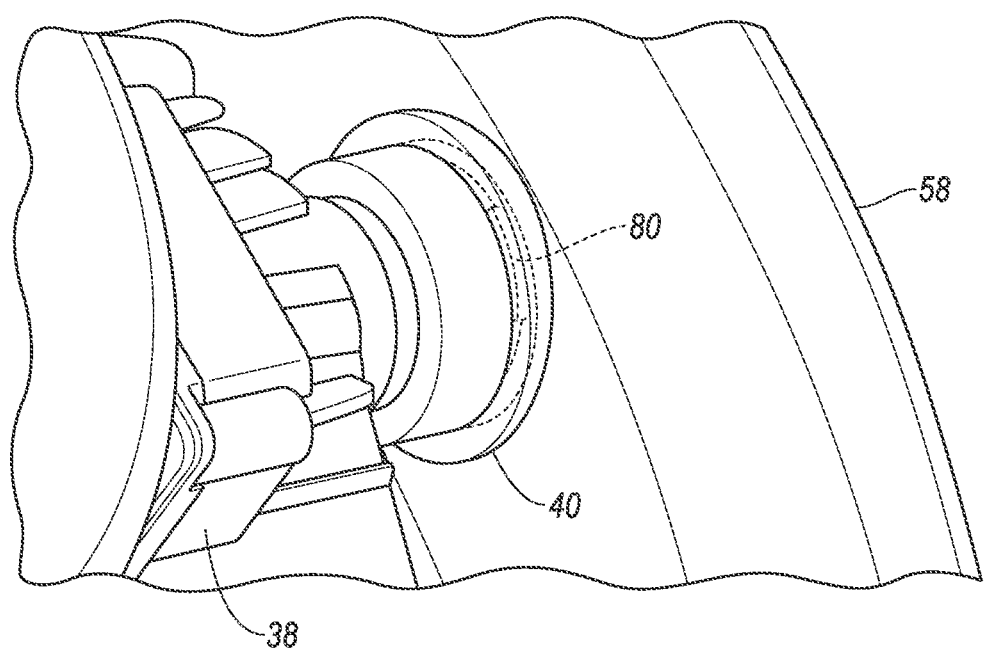
FIG. 7 is a perspective view of a sensor attached to the housing of FIG. 2.

With reference to FIGS. 6 and 7, the housing 34 includes at least one rib 80 extending along an edge of each aperture 36. For example, the housing 34 may include two ribs 80 for each aperture 36. The ribs 80 may be disposed radially opposite each other on each aperture 36. The ribs 80 may each extend circumferentially for between 15° and 90°, e.g., approximately 45°, relative to the respective aperture 36. The ribs 80 may border the respective aperture 36 and extend radially inward relative to the tray 58.

The seal 40 seals the gap 42 between the sensor 38 and the aperture 36. The seal 40 may be any sufficiently flexible and hard material, e.g., an elastomer such as closed-cell ethylene propylene diene monomer (EDPM) rubber.

The seal 40 may have a tubular shape. The seal 40 may be radially symmetric; i.e., the seal 40 may define an axis and be radially symmetric about that axis. The seal 40 may include a bore 82. The bore 82 may be aligned with the aperture 36, i.e., may be coaxial with the aperture 36; in other words, the bore 82 may define an axis, and the aperture 36 may define the same axis. The bore 82 may include a first section 84 and a second section 86, and the bore 82 may consist of the first section 84 and the second section 86. The first section 84 and the second section 86 may be adjacent to one another. The second section 86 may be between the first section 84 and the aperture 36. The first section 84 may have a smaller diameter than the second section 86. The seal 40 may include a contact surface 88. The contact surface 88 may extend radially outwardly from the bore 82 at an end of the seal 40. The contact surface 88 may extend radially outwardly from the second section 86. The second section 86 may be between the first section 84 and the contact surface 88.

Each seal 40 is attached to the respective sensor 38. Each seal 40 may be directly attached to the respective sensor 38, i.e., attached to the respective sensor 38 without intermediate components, i.e., components spacing the seal 40 and sensor 38 apart; for example, the seal 40 and the sensor 38 may be attached via adhesive, fastening, etc. For example, the sensor 38 may include a groove 90, and the seal 40, e.g., the first section 84, may be engaged with the groove 90. The seal 40 may have an interference fit with the sensor 38. In other words, the diameter of the first section 84 of the seal 40 when separated from the sensor 38 may be smaller than the diameter of the groove 90 of the sensor 38. The sensor 38 may extend through the first section 84; e.g., the sensor 38 may extend concentrically through the second section 86 while being spaced from the second section 86.

The contact surface 88 of each seal 40 abuts the housing 34. Each seal 40 may be attached to the housing 34. Each seal 40 may be directly attached to the housing 34, i.e., attached to the housing 34 without intermediate components, i.e., components spacing the seal 40 and the housing 34 apart; for example, the seal 40 may be adhered to the housing 34. Each seal 40 is attached to the housing 34 concentrically around the respective aperture 36. Each seal 40 may extend up to the respective aperture 36 without extending into the aperture 36. The seal 40 may be engaged with the respective ribs 80. For example, the seal 40 may include a lip 92 cut out between the second section 86 of the bore 82 and the contact surface 88. The lip 92 may be shaped to contact the rib 80 along surfaces facing at least two directions, e.g., axially relative to the seal 40 and radially relative to the seal 40.

In operation, the blower 44 draws in air from the ambient environment and directs the air to the first chamber 70. The blower 44 causes the pressure of the first chamber 70 to increase above the atmospheric pressure outside the housing 34. The increased pressure presses the seals 40 more firmly against the respective sensors 38 and more firmly against the outer wall 64 of the tray 58 of the housing 34 than a seal alone. The apparatus 30 may maintain a seal between the sensor 38 and the housing 34 with few or no intermediate components other than the seal 40 between the sensor 38 and the housing 34.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance or order. Many modifications and variations of the present disclosure are possible in light of the above teachings, and the disclosure may be practiced otherwise than as specifically described.

What is claimed is:

1. An apparatus comprising:
a housing including an aperture;
a sensor in the housing and having a field of view received through the aperture;
a seal sealing a gap between the sensor and the aperture; and
a blower positioned to blow into the housing;
wherein the seal includes a contact surface abutting the housing and a bore aligned with the aperture.

2. The apparatus of claim 1, wherein the seal is attached to the housing concentrically around the aperture.

3. The apparatus of claim 1, wherein the seal is adhered to the housing.

4. The apparatus of claim 1, wherein the sensor includes a groove, and the seal is engaged with the groove.

5. The apparatus of claim 1, wherein the seal has an interference fit with the sensor.

6. The apparatus of claim 1, wherein the housing includes a rib extending along an edge of the aperture, and the seal is engaged with the rib.

7. The apparatus of claim 1, wherein the bore includes a first section spaced from the sensor and a second section concentrically contacting the sensor, and the second section is between the first section and the aperture.

8. The apparatus of claim 7, wherein the sensor extends through the second section.

9. The apparatus of claim 1, wherein the sensor extends into the aperture.

10. The apparatus of claim 1, wherein the seal is radially symmetric.

11. The apparatus of claim 1, wherein the housing includes a chamber in which the sensor is disposed, and the blower is disposed outside the chamber and positioned to blow into the chamber.

12. The apparatus of claim 11, wherein the housing includes a second chamber in which the blower is disposed, and the blower is positioned to draw air from an ambient environment outside the housing.

13. The apparatus of claim 1, wherein the sensor includes a plurality of thermally conductive fins.

14. The apparatus of claim 1, wherein the aperture is a first aperture, the sensor is a first sensor, the seal is a first seal, and the housing includes a second aperture;
the apparatus further comprising a second sensor having a field of view received through the second aperture, and a second seal sealing a gap between the second sensor and the second aperture.

15. The apparatus of claim 14, wherein the housing includes a chamber, the first and second sensors are disposed in the chamber, and the blower is positioned to blow into the chamber.

16. An apparatus comprising:
a housing including an aperture;
a sensor in the housing and having a field of view received through the aperture;
a seal sealing a gap between the sensor and the aperture; and
means for pressurizing the housing;
wherein the sensor includes a plurality of thermally conductive fins.

17. The apparatus of claim 16, wherein the seal is attached to the housing concentrically around the aperture.

18. The apparatus of claim 16, wherein the seal has an interference fit with the sensor.

19. An apparatus comprising:
a housing including an aperture;
a sensor in the housing and having a field of view received through the aperture;
a seal sealing a gap between the sensor and the aperture; and
a blower positioned to blow into the housing;
wherein the housing includes a chamber in which the sensor is disposed; and
the blower is disposed outside the chamber and positioned to blow into the chamber.

20. An apparatus comprising:
a housing including a first aperture, a second aperture, and a chamber;
a first sensor disposed in the chamber and having a field of view received through the first aperture;
a second sensor disposed in the chamber having a field of view received through the second aperture;
a first seal sealing a gap between the first sensor and the first aperture;
a second seal sealing a gap between the second sensor and the second aperture; and
a blower positioned to blow into the housing and into the chamber.

* * * * *